(12) United States Patent
Mattson et al.

(10) Patent No.: US 6,217,222 B1
(45) Date of Patent: Apr. 17, 2001

(54) NOTCHING CONSTRUCTION AND METHOD

(75) Inventors: Arthur Mattson, Duncansville; Mark J. Cutler, Collegeville; Jerry Meyer, Downingtown; Keith Meyers, Collegeville, all of PA (US); David A. Winkel, Middletown, CT (US)

(73) Assignee: SKF USA Inc., Norristown, PA (US)

( * ) Notice: Subject to any disclaimer, the term of this patent is extended or adjusted under 35 U.S.C. 154(b) by 0 days.

(21) Appl. No.: 09/427,482

(22) Filed: Oct. 27, 1999

Related U.S. Application Data (60) Provisional application No. 60/108,990, filed on Nov. 18, 1998.

(51) Int. Cl.$^7$ .............................. F16C 33/60; B23P 17/00
(52) U.S. Cl. ........................................... 384/503; 29/413
(58) Field of Search ................................ 384/503, 209, 384/276; 29/413, 898.066, 898.063, 888.09

(56) References Cited

U.S. PATENT DOCUMENTS

| | | |
|---|---|---|
| 1,498,748 | 6/1924 | Pierce, Jr. ............................ 384/542 |
| 2,371,399 | 3/1945 | Mantle ............................... 29/898.12 |
| 2,702,216 | 2/1955 | Stearns ................................. 384/503 |
| 3,179,477 * | 4/1965 | Carter ..................................... 29/413 |
| 3,546,762 | 12/1970 | Martin ............................... 29/898.063 |
| 3,581,363 * | 6/1971 | Roesner et al. .................... 29/413 X |
| 3,627,389 * | 12/1971 | Foote, Jr. et al. .................... 384/208 |
| 3,818,577 | 6/1974 | Bailey et al. .......................... 29/413 |
| 3,858,288 | 1/1975 | Ladin et al. ..................... 29/898.063 |
| 3,994,054 * | 11/1976 | Cuddon-Fletcher .............. 29/888.09 |
| 4,412,372 | 11/1983 | Olschewski et al. ........... 29/898.066 |
| 4,541,157 | 9/1985 | Tsushima et al. .............. 29/898.066 |
| 4,671,682 * | 6/1987 | Yoshihara ........................ 384/503 X |
| 4,884,900 | 12/1989 | Pirault et al. ........................ 384/434 |
| 5,507,093 | 4/1996 | Wittenstein et al. ............. 29/888.09 |
| 5,586,380 | 12/1996 | Shimmell ............................. 29/413 |
| 5,826,331 | 10/1998 | Myers et al. ...................... 29/888.09 |

* cited by examiner

*Primary Examiner*—Thomas R. Hannon
(74) *Attorney, Agent, or Firm*—Burns, Doane, Swecker & Mathis, L.L.P.

(57) ABSTRACT

A configuration that promotes cleaner fracture by reducing or eliminating secondary fractures includes a plurality of distinct interconnecting regions defining a plurality of separate fracture regions that are separated by an interruption.

33 Claims, 6 Drawing Sheets

NOTCHING CONSTRUCTION AND METHOD

This application claims benefit of provisional application No. 60/108,990 filed Nov. 18, 1998.

FIELD OF THE INVENTION

The present invention generally relates to a notching construction and method that facilitates fracture of an otherwise solid cross section. More particularly, the present invention pertains to a notching construction and method that facilitates fracture of an outer ring of a spherical plain bearing.

BACKGROUND OF THE INVENTION

In the description of the background of the present invention that follows reference is made to certain structures and methods, however, such references should not necessarily be construed as an admission that these structures and methods qualify as prior art under the applicable statutory provisions.

It is often desirable to separate a bearing ring into different pieces by intentionally fracturing the ring at a desired location.

One such bearing ring that is advantageously fractured at one or more locations along its circumference is an outer ring of a spherical plain bearing. Spherical plain bearings are used in numerous applications, such as in construction and other equipment.

Figure 1A:
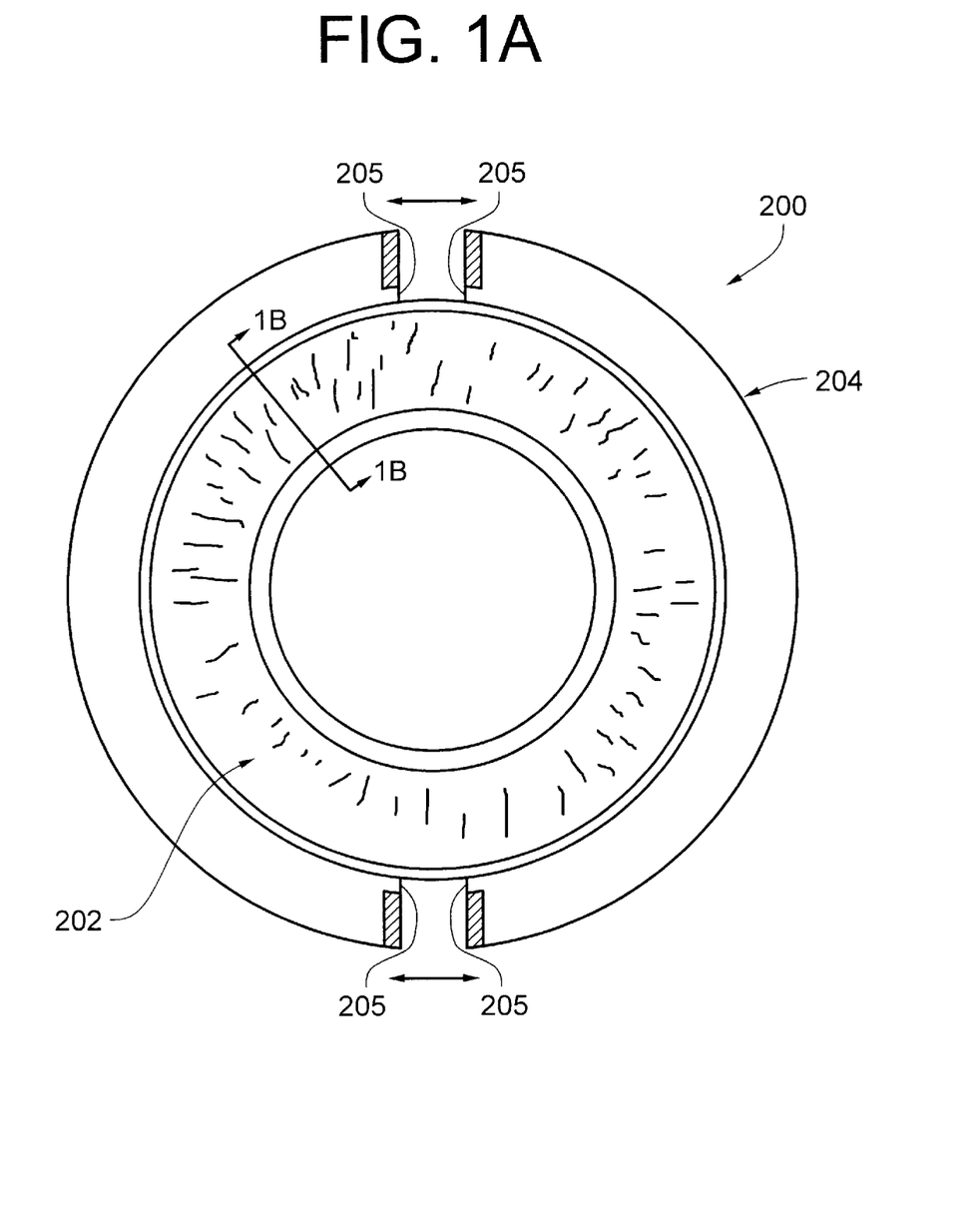
FIG. 1A is a plan view of a spherical plain bearing.

FIG. 1A is a plan view of a spherical plain bearing 200. The bearing 200 generally comprises a continuous inner ring member 202 and an outer ring member 204. The outer ring 204 as illustrated in FIG. 1A is "double fractured" or segmented into two pieces that can be moved apart and mounted over the inner bearing ring 202. When mounting of the outer ring 204 is complete, the free ends 205 of the double fractured ring are brought together and the gaps between the two ring parts are closed.

Figure 1B:
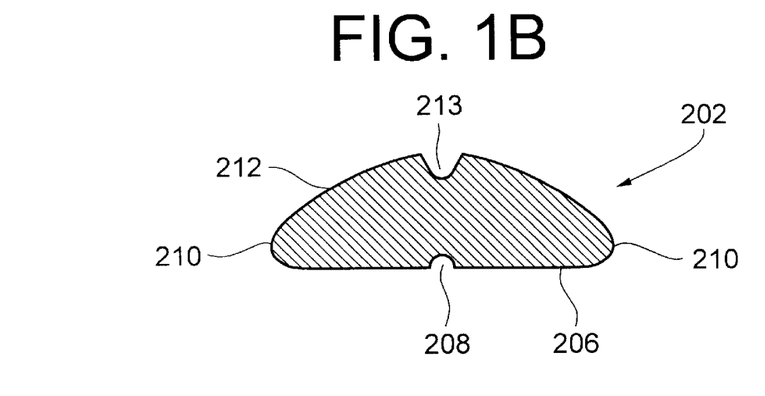
FIG. 1B is a cross-sectional view taken along line 1B—1B of FIG. 1A.

FIG. 1B is a cross-sectional view taken along the section line 1B—1B of FIG. 1A, and illustrates certain features of the inner bearing ring 202. The inner bearing ring 202 generally includes a substantially cylindrical inner surface 206, and optionally having an inner peripheral groove 208 which distributes lubricant along the inner surface 206, the edge surface 210 and the outer arcuate surface 212 of the inner bearing ring 202. The outer arcuate surface 212 of the inner bearing ring 202 may optionally be provided with an outer peripheral groove 213 disposed therein. A through hole (not shown) radially interconnecting the inner and outer peripheral grooves 208 and 213 may also be provided for allowing lubricant to flow between the grooves 208 and 213.

Figure 1C:
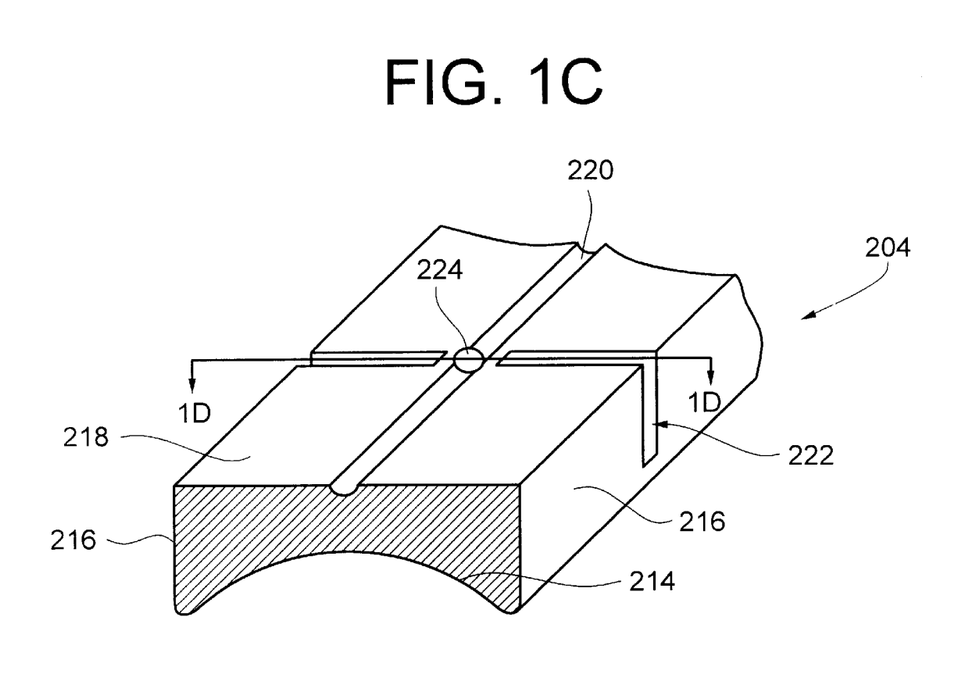
FIG. 1C is a sectional partial perspective view of an outer bearing ring.

FIG. 1C is a sectional partial perspective view of the outer bearing ring 204, prior to fracture. The outer bearing ring 204 generally comprises an inner arcuate surface 214 that receives the outer arcuate surface 212 of the inner bearing ring 202 in a nested relationship. The edge surfaces 216 of the outer bearing ring 204 each extend radially, and are interconnected by a substantially cylindrical outer peripheral surface 218. An outer peripheral groove 220 may be provided in the outer peripheral surface 218 of the outer bearing ring 204 to distribute lubricant along the outer peripheral surface 218.

A notched area 222 is provided in the outer bearing ring 204 by any suitable material removal technique, such as sawing or milling. The notched area 222 does not extend completely through the bearing ring 204. A centrally-located blind hole 224 or a multiple number of blind holes across the surface 218 may also be provided in the outer bearing ring 204. The blind hole 224 may be formed by any suitable material removal technique, such as drilling. Although only one notched region 222 and accompanying blind hole 224 are shown in FIG. 1C, typically a substantially identical construction is provided on the diametrically opposite side of the outer bearing ring 204.

Figure 1D:
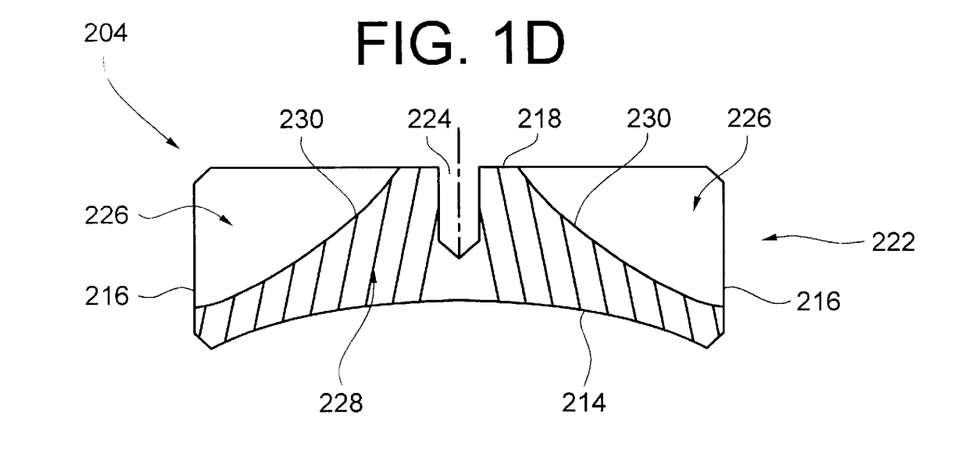
FIG. 1D is a cross-sectional view taken along line 1D—1D of FIG. 1C.
Figure 1E:
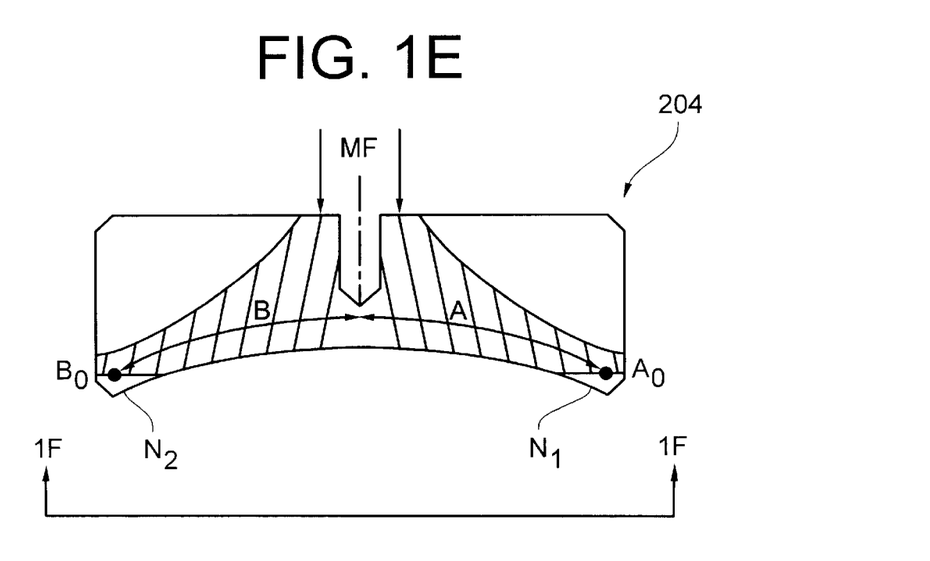
FIG. 1E is a cross-sectional view of like FIG. 1D illustrating an ideal fracture pattern.

FIG. 1D is a cross-sectional view taken along the section line 1D—1D of FIG. 1C and illustrates certain features of the notched area 222. A gap or space 226 on either side of the cross-section of the outer ring 204 represents the area where the material of the outer ring 204 has been removed to form the notched area 222. As illustrated by gap 226 in FIG. 1D, only a portion on either side of the cross-section of outer ring 204 is removed. That portion of the cross-section that remains defines an interconnecting region or fracture region 228 which is represented by the cross-hatched area shown in FIG. 1D. The interconnecting region 228 is bounded by the inner arcuate surface 214, a portion of the edge surfaces 216, the arcuate surfaces 230 on either side of the cross section, and a portion of outer substantially cylindrical surface 218. The blind hole 224 may be provided in the region 228.

The outer ring 204 with the above-described construction is case or surface hardened and then fractured. The outer ring 204 is fractured along the interconnecting region 228 to form two ring parts having separated ends 205 (FIG. 1A). The outer ring 204 is fractured by the application of mechanical force to the outer periphery of the ring in the notched area(s) 222.

By providing the interconnecting region 228 with a relatively small cross-sectional area the case hardening or surface hardening treatment can more easily penetrate through the entire interconnecting region 228 and cause this region to become sufficiently "brittle", thus facilitating fracturing. In addition, the blind hole 224 is provided to further facilitate the penetration of the case or surface hardening treatment through the cross section.

The fracture mechanics of this construction can be better understood by reference to FIGS. 1E–1H. Typically, a pair of notches N1, N2 is formed at both axial sides of the ring 204. As a mechanical force MF is applied to the outer periphery of the ring 204, cracks A, B originate within the interconnecting region 228 at points IE $A_o$, $B_o$ in the vicinity of the notches N1, N2, respectively. These cracks A, B propagate toward each other.

Figure 1F:
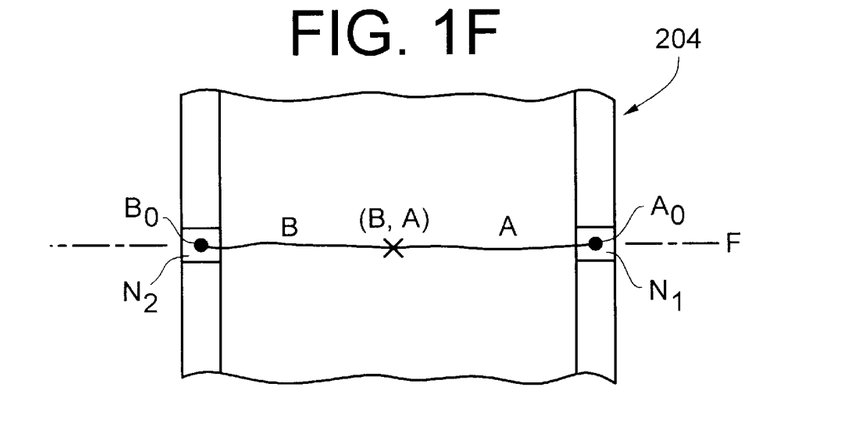
FIG. 1F is a partial bottom view from the perspective of line 1F—1F of FIG. 1E illustrating the ideal fracture pattern.

Under ideal circumstances, cracks A, B propagate toward each other until the leading end or tip of one crack A, B runs into the leading end or tip of the other crack B to thereby define a fracture plane F corresponding to a line interconnecting $B_o$, B and $A_o$, A, as illustrated in FIG. 1F. However, it has been discovered that in practice this rarely occurs. Instead, a fracture pattern similar to that illustrated in FIG. 1G and/or FIG. 1H often occurs.

Figure 1G:
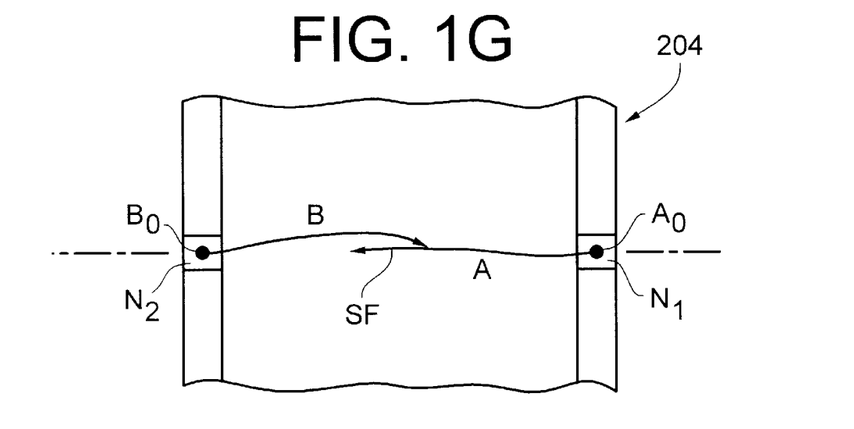
FIG. 1G is bottom a view like FIG. 1F, illustrating a typical fracture pattern.

As shown in FIG. 1G, the cracks A, B propagate toward one another, but the leading ends or tips of the cracks pass one another and do not intersect. Instead, the leading end of one crack B may eventually run into or intersect a portion of the other crack A at a point spaced from the leading end of the other crack A. The distance between this point of intersection and the leading end of the crack being intersected A defines a secondary fracture SF which represents a residual fracture or crack that is not needed to form the fracture plane across the cross section of the outer ring 204.

Figure 1H:
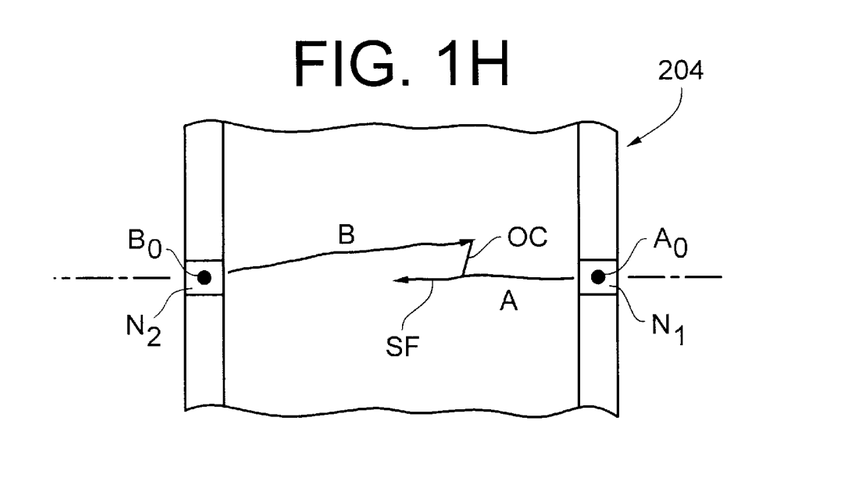
FIG. 1H is a bottom view like FIG. 1F, illustrating another typical fracture pattern.

Alternatively, as shown in FIG. 1H, the leading end of one crack may never entirely intersect the body of the other crack. Instead, an offset crack OC can form between the leading end of one crack B, with this offset crack C then intersecting the body of the other crack A. This forms a secondary fracture SF between the point where offset crack OC intersects the body of the crack A and the leading end of the crack being intersected A.

These secondary or residual fractures define a weakness in the cross-section of the outer ring 204 and can further propagate, possibly causing a chip of material to be dislodged from the outer ring 204. This can result in a reduction in service life of the bearing and the equipment in which the bearing is installed.

After the outer ring 204 has been fractured at the region 228, the resulting free ends 205 have a surface area defined by the area of the region 228. The free ends 205 are brought into contact with each other after the outer ring has been placed over the inner ring 202. Because the area of the region 228 is relatively small, by virtue of the amount a significant amount of material removed from the cross section in the regions 226, the contact pressure between the free ends 205 of the split ring is relatively large. This increased contact pressure can cause damage to the ends 205 of the outer ring 204.

Therefore, it would be desirable to provide a notched area that promotes cleaner separation by reducing or eliminating secondary fractures.

It would also be advantageous to reduce the amount of material removed from the cross-section when forming the notched area in order to maintain a relatively large area of contact between the free ends formed by the fracture, thereby reducing the contact pressure between the free ends of the outer ring. In addition, it would be advantageous to reduce the amount of machining or milling required to remove material from the cross section when forming the notch area.

SUMMARY OF THE INVENTION

The present invention addresses the above-mentioned problems, and others, by providing a unique notching configuration that promotes a clean fracture, while reducing the amount of material that must be removed to form the notch configuration.

A fracture area formed consistent with the principles of the present invention includes a plurality of distinct interconnecting regions defining a plurality of separated fracture regions, and at least one interruption entering from one side of the cross section and exiting through another side, the at least one interruption provided to separate and create a plurality of fracture planes.

A method of separating or fracturing a cross section consistent with the principles of the present invention includes forming an interruption in the cross section thereby separating the interconnecting region into a plurality of distinct interconnecting regions or fracture planes, providing a crack initiating formation at either side of the cross section, and applying mechanical force to the outer periphery of the ring in the area of the gap or space causing at least one crack to form at each initiating formation and propagate toward and into the at least one interruption, thereby fracturing the cross section at the fracture planes to form separated opposed ends from the interconnecting regions.

DETAILED DESCRIPTION OF THE INVENTION

Figure 2A:
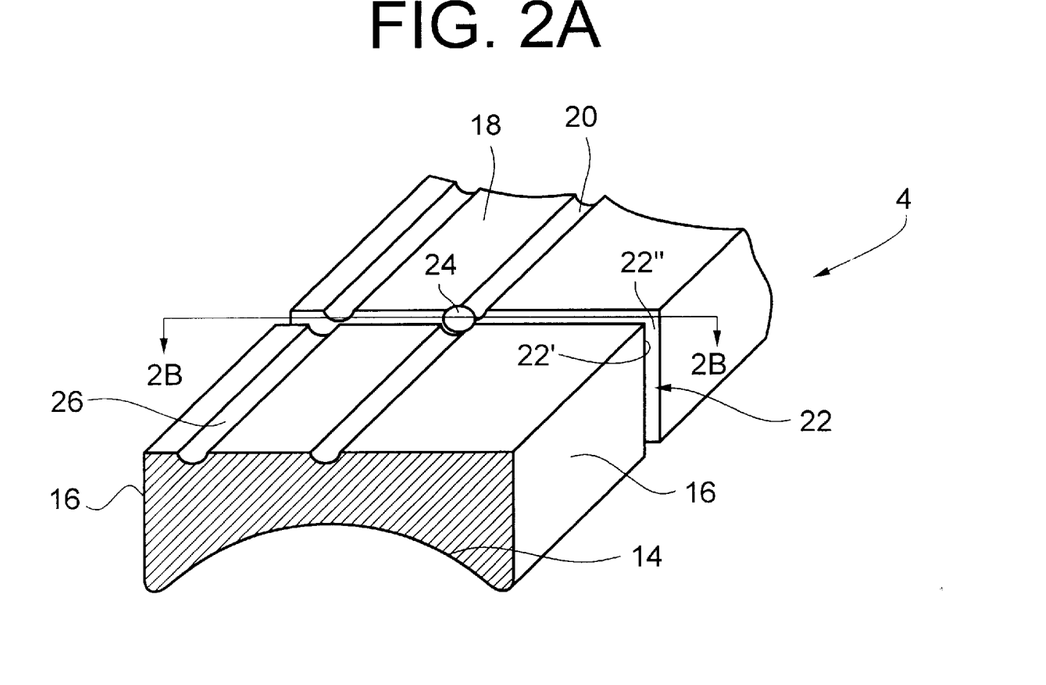
FIG. 2A is a sectional partial perspective view of an outer bearing ring constructed accord the present invention.

FIG. 2A is a sectional partial perspective view of an outer bearing ring 4 constructed according to the principles of the present invention. The outer bearing ring 4 can be made from any suitable bearing material. For example, the outer bearing ring 4 can be made from a steel, such as AISI 8620 steel. The outer bearing ring 4 is preferably subjected to a suitable hardening treatment. In one preferred embodiment the ring is case or surface hardened such that the surface region of the ring has a hardness that exceeds the core region of the ring. For instance, the outer ring 4 may be treated in a manner that provides the surface of the outer ring 4 with a high Rockwell C hardness, and a core with a lower Rockwell C hardness.

The outer bearing ring 4 generally comprises an inner arcuate or circular surface 14 that receives an outer arcuate or circular surface of an inner bearing ring in a nested relationship. The outer bearing ring 4 includes radially extending edge surfaces 16 that are interconnected by a substantially cylindrical outer surface 18. A first generally centrally-located outer peripheral groove 20 may be provided in the outer surface 18 to direct lubricant along the outer surface 18 of the outer bearing ring 4. A second outer peripheral groove 26 may optionally be provided in the outer surface 18 to form a seat for a snap ring (not shown) or similar member that helps hold the separated segments of the ring together.

A notched area 22 for promoting fracture is provided in the cross section of the outer bearing ring 4 by any suitable material removal technique, such as sawing or milling. As clearly shown, for example, in FIG. 2A, notched area 22 may include two parallel side walls 22', 22". A centrally located and radially directed through hole 24 extends completely through the outer bearing ring 4 from the outer surface 18 to the inner surface 14. The through hole 24 can be formed by any suitable material removal technique, such as drilling.

Although only one notched area 22 and accompanying through hole 24 are illustrated in FIG. 2A, any suitable number may be provided. For example, an essentially identical construction can be provided on the diametrically opposite side of outer bearing ring 4.

Figure 2B:
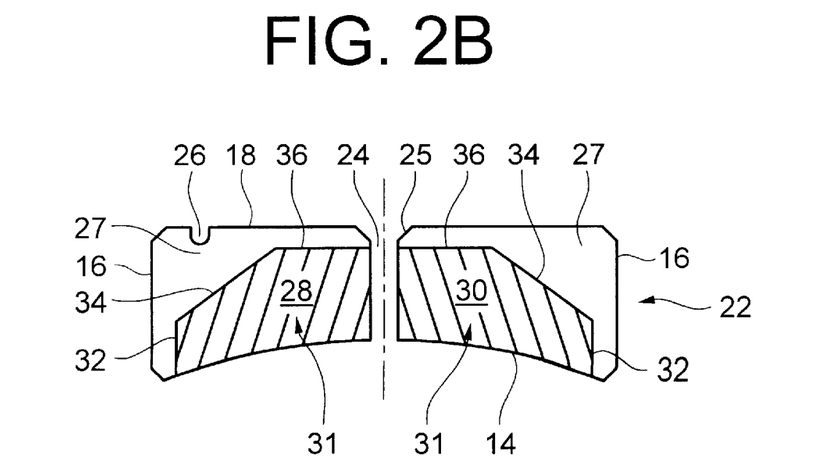
FIG. 2B is a cross-sectional view taken along line 2B—2B of FIG. 2A.

FIG. 2B is a cross-sectional view of the notched area 22. A gap or space 27 on either side of the cross section of the outer ring 4 represents the area where the material of the outer ring 4 has been removed. As shown, only a portion of the cross section of the outer bearing ring 4 is removed. That portion of the cross section that remains defines an interconnecting region or fracture region 31 which is represented by the cross hatched area in FIG. 2B. This interconnecting region 31 is actually defined by a plurality of separate and distinct adjacent interconnecting regions 28 and 30, which are separated by the through hole 24. This through hole 24 thus forms an interruption in the interconnecting region 31. While the illustrated embodiment utilizes the through hole 24 to form the interruption, other structures that define such an interruption may be utilized, such as another form of void. The through hole 24 may optionally include a grooved or countersunk area 25 along the outer surface 18 of the outer ring 4 to promote a cleaner fracture.

In the illustrated embodiment, each of the interconnecting regions 28 and 30 are bounded and defined by a portion of the inner arcuate surface 14, a first surface 32, second surface 34 and a third surface 36.

In the embodiment illustrated in FIG. 2B, the first surface 32 extends in a spaced parallel relationship to the edge surface 16. However, it is within the scope of the present invention that the first surface 32 form an angle with respect to the edge surface 16. The first surface 32 is connected to the second angled surface 34. The second angled surface 34 is connected to the third surface 36. In the illustrated embodiment surface 36 extends in a spaced parallel relationship to the outer surface 18. It can be seen that in the illustrated embodiment the third surface 36 is spaced radially inwardly of the outer surface 18 of the outer bearing ring 4. Of course other configurations are possible. For example, third surface 36 can be at least partially coextensive with the outer surface 18, in a manner similar to that described in connection with FIG. 2D.

By virtue of the present invention, including the provision of the through hole 24, it is possible to obtain a clean fracture of the outer bearing ring 4, yet not remove as much material from the cross section of the outer bearing ring as is necessary in other constructions. In the illustrated embodiment, the combined cross-sectional area of the interconnecting regions 28 and 30 is significantly greater than the cross-sectional area of the interconnecting regions of other constructions, such as the interconnecting region 228 of FIG. 1D. By way of example, the cross-sectional area of the interconnecting regions 28 and 30 could be on the order of 1.6 times greater than the cross-sectional area of other interconnections, regions, such as region 228 of FIG. 2D.

This increased cross-sectional area in the interconnection region 31 advantageously allows for a reduction in costly machining processes. In addition, the contact pressure (when the bearing is mounted) between the ends of the ring 4 formed after fracture is reduced relative to conventional constructions.

As mentioned above, separating the interconnecting region 31 into a plurality of distinct and completely separated regions or fracture regions 28, 30 advantageously provides a cleaner fracture and reduces or eliminates secondary fractures when the outer bearing ring is fractured through the application of a mechanical force. This is due at least in part to the provision of the interruption or through hole 24 which completely separates the interconnecting region 31 into two separate regions or fracture regions 28, 30. The interruption or through hole 24 avoids the problems described above in that the leading ends of the cracks propagating from both axial sides of the outer bearing ring need not intersect one another to obtain a clean fracture. Rather, the interruption or though hole 24 defines a point at which the leading ends of the cracks stop and cannot propagate further.

Figure 2C:
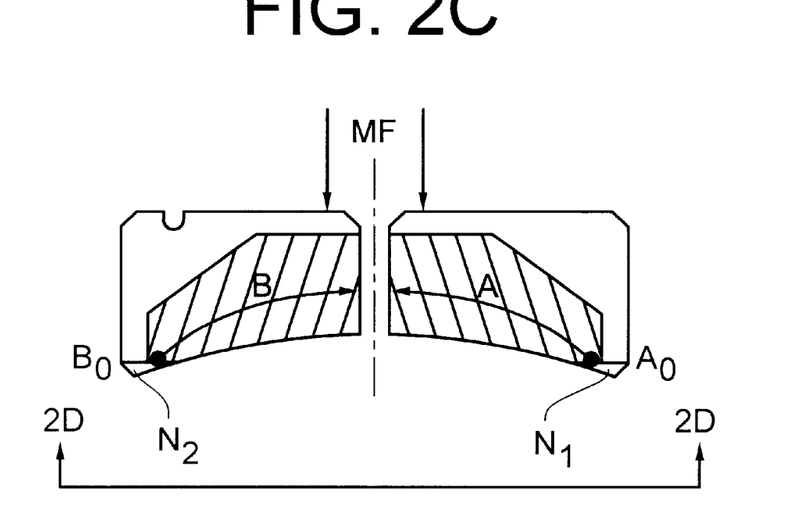
FIG. 2C is a cross-sectional view of like FIG. 2B illustrating a fracture pattern of the present invention.
Figure 2D:
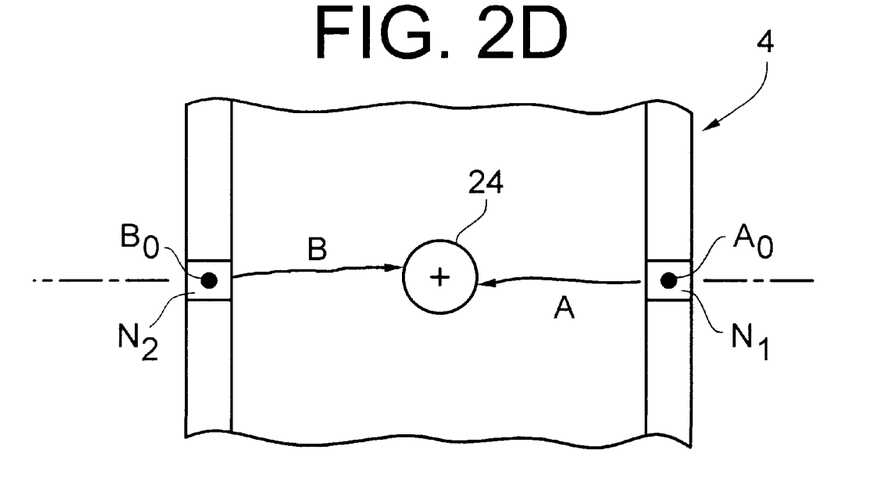
FIG. 2D is a partial bottom view from the perspective of line 2D—2D of FIG. 2C illustrating the fracture pattern of the present invention.

To fracture the outer bearing ring 4, a pair of notches N1, N2 is formed at both axial sides of the cross section of the ring 4 as illustrated in FIGS. 2C and 2D. A mechanical force MF is then applied to the outer periphery of the ring 4. This mechanical force MF causes cracks A, B to originate within the interconnecting region 31 at the points $A_o$, $B_o$ in the vicinity of the notches N1, N2, respectively. These cracks A, B then propagate toward each other. The centrally-located through hole 24 substantially interrupts the cracks A, B before they can cross each other. By this construction, detrimental residual and secondary cracks are avoided.

The method of separating or fracturing a cross section such as an outer bearing ring according to the principles of the present invention may include creating a gap or space 27 by removing material from the cross section by any suitable technique, such as sawing or milling, thereby leaving an interconnecting region 31.

An interruption in the cross section that separates the interconnecting region into a plurality of distinct interconnecting regions 28, 30 or fracture regions is formed. In one embodiment, this interruption is formed by the through hole 24. The through hole 24 can be formed by any suitable technique, such as drilling.

A crack initiating formation is provided at either side of the cross section. In one embodiment, the crack initiating formation is in the form of a plurality of notches N1, N2.

A radially inwardly directed mechanical force MF is then applied to the outer periphery 18 of the ring 4 in the area of the gap or space 27. This force MF causes at least one crack A, B to form at each initiating formation $A_o$, $B_o$. The crack propagates toward and into the at least one interruption 24, thereby fracturing the cross section at the fracture regions 28, 30 to form separated opposed ends from these regions 28, 30.

It should be noted that under certain circumstances, it is possible to omit the above-mentioned material removal step. For example, the size of the cross-section and/or properties of the ring material can make it possible to fracture the ring without creating a space or gap 27 therein.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes, and equivalents which fall within the spirit and scope of the invention be embraced thereby.

What is claimed is:

1. A bearing ring comprising:
    an axially-extending inner peripheral surface, an axially-extending outer peripheral surface, and first and second radially-extending edge surfaces, each of said edge surfaces interconnecting said inner peripheral surface with said outer peripheral surface;
    at least one notched area formed along the circumference of the ring, said notched area comprising;
        a gap formed in the cross-section of the ring, said gap being bounded by first, second and third surfaces, said second surface interconnects said first and third surfaces,
        said first, second and third surfaces are defined on a fracture region of the cross section, and
    at least one interruption extending from said inner peripheral surface to said outer peripheral surface, said interruption separating said fracture region into a plurality of adjacently disposed interconnecting regions.

2. The ring of claim 1, wherein said at least one interruption comprises a through hole.

3. The ring of claim 1, further comprising a plurality of notched areas formed along the circumference of said ring, said plurality of notched areas being disposed on diametrically opposite locations of the ring.

4. The ring of claim 1, wherein said ring is segmented thereby defining two substantially symmetrical segments.

5. The ring of claim 1, wherein said gap extends axially in a substantially straight line from said first edge surface to said second edge surface.

6. The ring of claim 1, wherein at least a portion of said first surface is axially spaced from said edge surfaces.

7. The ring of claim 6, wherein said first surface is disposed in spaced parallel relationship to said edge surfaces.

8. The ring of claim 1, wherein at least a portion of said third surface is radially spaced from said outer peripheral surface.

9. The ring of claim 8, wherein said first surface is disposed in spaced parallel relationship to said outer peripheral surface.

10. The ring of claim 1, wherein said second surface is an oblique surface.

11. The ring of claim 1, wherein said first surface is disposed in spaced parallel relationship to said edge surfaces, said third surface is disposed in spaced parallel relationship to said outer peripheral surface, and said second surface is an oblique surface.

12. The ring of claim 1, wherein said gap is bounded by a plurality of parallel side walls.

13. The ring of claim 1, wherein said ring is surface hardened such that a surface region of the ring has a hardness that exceeds the hardness of the core region of said ring.

14. The ring of claim 1, wherein said inner peripheral surface is arcuate.

15. The ring of claim 1, wherein said through hole is countersunk into said outer peripheral surface.

16. The ring of claim 1 further comprising a notch formed along the inner periphery of the ring at each of said first and second edge surfaces.

17. A method of fracturing the cross section of a ring, said ring having an axially-extending inner peripheral surface, an axially-extending outer peripheral surface, and first and second radially-extending edge surfaces, said method comprising the steps of:
   (a) removing material from the cross section thereby forming at least one notched area comprising a gap bounded by first, second, and third surfaces, said second surface interconnecting said first and third surfaces, said first, second, and third surfaces being defined on a fracture region of the cross section;
   (b) forming at least one interruption extending from said inner peripheral surface to said outer peripheral surface thereby separating said fracture region into a plurality of adjacently disposed interconnecting regions; and
   (c) applying a mechanical force to the outer periphery of the ring thereby causing cracks to form in said at least one notched area, said cracks propagating from said edge surfaces to said interruption thereby causing said cross section to be separated at said fracture region.

18. The method of claim 17, wherein step (b) comprises drilling a through hole in said cross section.

19. The method of claim 18, further comprising the step of:
   (d) countersinking said through hole into said outer peripheral surface.

20. The method of claim 17, further comprising forming a plurality of notched areas at diametrically opposite locations of said ring.

21. The method of claim 20 further comprising forming said gap in a substantially straight line extending from said first edge surface to said second edge surface.

22. The method of claim 17, wherein step (a) includes removing material from said cross-section such that said first surface is formed in a spaced parallel relationship to said edge surfaces, said third surface is formed in a spaced parallel relationship to said outer peripheral surface, and said second surface is formed as an oblique surface that interconnects said first and third surface.

23. The method of claim 17, wherein step (a) includes removing material from the cross-section to form a gap having parallel side walls.

24. The method of claim 17, further comprising the step of:
   (d) heat treating said bearing ring to provide a surface region of said ring with a hardness that exceeds the hardness of a core region of said ring.

25. The method of claim 17, further comprising the step of:
   (d) forming a notch along the inner periphery of the ring at said first and second edge surfaces prior to the application of said mechanical force to the ring.

26. The method of claim 17, wherein step (c) further comprises applying a radial mechanical force to said ring.

27. A ring comprising:
   at least one notched area formed along the circumference of the ring, said notched area comprising;
      a gap formed in the cross-section of the ring, said gap being bounded by first, second and third surfaces, said second surface interconnects said first and third surfaces,
      said first, second and third surfaces are defined on a fracture region of the cross section, and
   at least one interruption extending from an inner peripheral surface to an outer peripheral surface, said interruption separating said fracture region into a plurality of adjacently disposed interconnecting regions.

28. The ring of claim 27, wherein said at least one interruption comprises a through hole.

29. The ring of claim 27, further comprising a plurality of notched areas formed along the circumference of said ring, said plurality of notched areas being disposed on diametrically opposite sides of the ring.

30. The ring of claim 27, wherein said gap extends axially in a substantially straight line from said first edge surface to said second edge surface.

31. The ring of claim 27, wherein said first surface is disposed in spaced parallel relationship to said edge surfaces, said third surface is disposed in spaced parallel relationship to said outer peripheral surface, and said second surface is an oblique surface.

32. The ring of claim 27, wherein said gap is bounded by a plurality of parallel side walls.

33. The ring of claim 27, wherein said ring is surface hardened such that a surface region of the ring has a hardness that exceeds the hardness of the core region of said ring.

* * * * *